United States Patent [19]

Kaminski et al.

[11] Patent Number: 4,795,197

[45] Date of Patent: Jan. 3, 1989

[54] COUPLING FOR SEED AND FERTILIZER HOSES

[75] Inventors: Earl W. Kaminski, Des Moines; David J. Brown, Altoona, both of Iowa

[73] Assignee: Deere & Company, Moline, Ill.

[21] Appl. No.: 66,927

[22] Filed: Jun. 29, 1987

[51] Int. Cl.$^4$ ............................................. F16L 21/06
[52] U.S. Cl. ....................................... 285/12; 285/419; 285/903
[58] Field of Search .................... 285/419, 903, 12

[56] References Cited

U.S. PATENT DOCUMENTS

| | | |
|---|---|---|
| 2,861,527 | 11/1958 | Phillips . |
| 2,912,089 | 11/1959 | Krause . |
| 3,239,254 | 3/1966 | Campbell ........................ 285/419 X |
| 3,456,965 | 7/1969 | Gajewski et al. ............... 285/419 X |
| 3,526,416 | 9/1970 | Kish .................................... 285/12 |
| 3,711,632 | 1/1973 | Ghirardi ......................... 285/419 X |
| 3,711,633 | 1/1973 | Ghirardi et al. ............... 285/903 X |
| 3,731,954 | 5/1973 | Haglund ............................. 285/12 |
| 4,049,144 | 9/1977 | Schimke ............................ 285/12 X |
| 4,133,312 | 1/1979 | Burd ................................. 285/12 X |
| 4,176,756 | 12/1979 | Gellman ........................ 285/419 X |
| 4,248,459 | 2/1981 | Pate et al. ....................... 285/419 X |
| 4,266,813 | 5/1981 | Oliver ................................ 285/12 |
| 4,273,367 | 6/1981 | Keeney et al. ...................... 285/419 |
| 4,443,031 | 4/1984 | Borsch et al. ..................... 285/419 |
| 4,452,097 | 6/1984 | Sunkel ............................ 285/419 X |

Primary Examiner—Thomas F. Callaghan

[57] ABSTRACT

An inexpensive and easy to use coupling for connecting one end of a corrugated flexible hose to a meter or distributor outlet, or to another hose on an implement such as an air drill or seeder. Two generally semi-cylindrical portions are molded as a single unit with integral hinge and locking structure. The inner surface of the cylindrical member is corrugated to correspond to the corrugations on the flexible hose, and an end portion of the coupling device includes an annular groove which mates with a flange on the outlet. The locking structure automatically latches as the semi-cylindrical portions are closed around the hose and the flange.

6 Claims, 2 Drawing Sheets

COUPLING FOR SEED AND FERTILIZER HOSES

BACKGROUND OF THE INVENTION

The present invention relates generally to seed and fertilizer implements and more specifically to a coupling for securing seed or fertilizer hoses to the discharge end of a metering or distribution device and for connecting ends of hoses together.

In a conventional seeding or fertilizing implement, hopper structure opens into a flanged output portion of metering device which in turn is connected to a flexible hose which directs the material being metered to a groundworking tool such as a disk or hoe opener. In an air seeder or drill, a relatively long length of hose is connected to a flanged output of a distributor to deliver material to the opener. Typically the hose includes a flared end which is positioned over the flange and is held by a metal band or other clamping arrangement. In another type of arrangement, such as shown in U.S. Pat. No. 2,912,089, a corrugation of the flexible tube is positioned over the flange to hold the tube in position. In still another arrangement, such as exemplified in U.S. Pat. No. 2,861,527, a rod-like member encircles the portion of the hose and meshes with the corrugated walls. The rod-like member is clipped to a portion of the implement to support the tube.

The previous devices for attaching the hoses all suffer from one or more disadvantages. The flared hoses must be manufactured to size and are expensive to fabricate, and the hoses having corrugations stretched over flanges are difficult to mount and remove and require well-defined end portions. Both of these types of construction are not easily repaired. The metal clamps and rod-like clamps are subject to corrosion and deformation, and the hoses tend to wear prematurely adjacent the clamp.

BRIEF SUMMARY OF THE INVENTION

It is therefore an object of the present invention to provide an improved and inexpensive coupling for attaching a hose to a meter or distributing device on a planting or fertilizing implement. It is a further object to provide such a coupling which overcomes the disadvantages of the previously available types of couplings.

It is another object of the invention to provide an improved hose coupling for a seed or fertilizer tube which reliably clamps the tube to meter or distributing structure, or to another hose, with minimal clamping force to thereby reduce fatigue in the tube.

It is still another object of the present invention to provide an improved coupling for a seed or fertilizer hose which eliminates need for metal clamps or springs or any type of clamp which tightly compresses the hose over a flange or outlet. It is another object to provide such a coupling which obviates flared hose ends and permits seed and fertilizer hoses to be cut to length as necessary from stock.

It is still another object of the present invention to provide a hose coupler for a fertilizer or seed tube which is more convenient and less time-consuming to use and yet which more securely holds the tube in position than at least most other previously available coupling arrangements. It is still another object of the invention to provide such a coupler which can also be used to connect two pieces of seed or fertilizer hose together.

It is yet a further object of the present invention to provide an improved coupling for seed or fertilizer hoses which is noncorrosive, inexpensive and is easy to use.

A hose coupling constructed in accordance with the above objects includes a unitary cylindrical member fabricated from plastic. The cylindrical member includes first and second generally semi-cylindrical portions and an integral molded hinge which permit the portions to rock about an axis parallel to the cylinder axis between an open released position and a closed clamping position. The inner surfaces of the semi-cylindrical portions are shaped to conform to the shape of the corrugated hose which is to be secured to a meter or distributing device on the implement. The inner surfaces also include a portion which generally conforms to the shape of the meter or distributor output so that when the semi-cylindrical portions are swung to the closed positions, the meter or distributor output is captured within the cylindrical member in a relatively airtight fashion. Latching devices are formed integrally wit the semi-cylindrical portions to automatically latch as the portions are rocked to the closed position.

The connecting device is very inexpensive to fabricate and simple to use. Connecting clamps or springs are eliminated, and since the device requires n flanged ends on the hoses, the hoses can be cut to length at the site and connected to the distributor or meter, thereby eliminating expense of flanged and specially sized hoses. The plastic parts provide a snug fit to eliminate air leakage when an air system is utilized and provide a reliable connection of the hose to the distributor or meter. The coupling may also be used to connect two sections of hose together.

These and other objects, features and advantages of the present invention will become apparent to those skilled in the art from the description which follows and from the drawings.

DESCRIPTION OF THE PREFERRED EMBODIMENT

Figure 1:
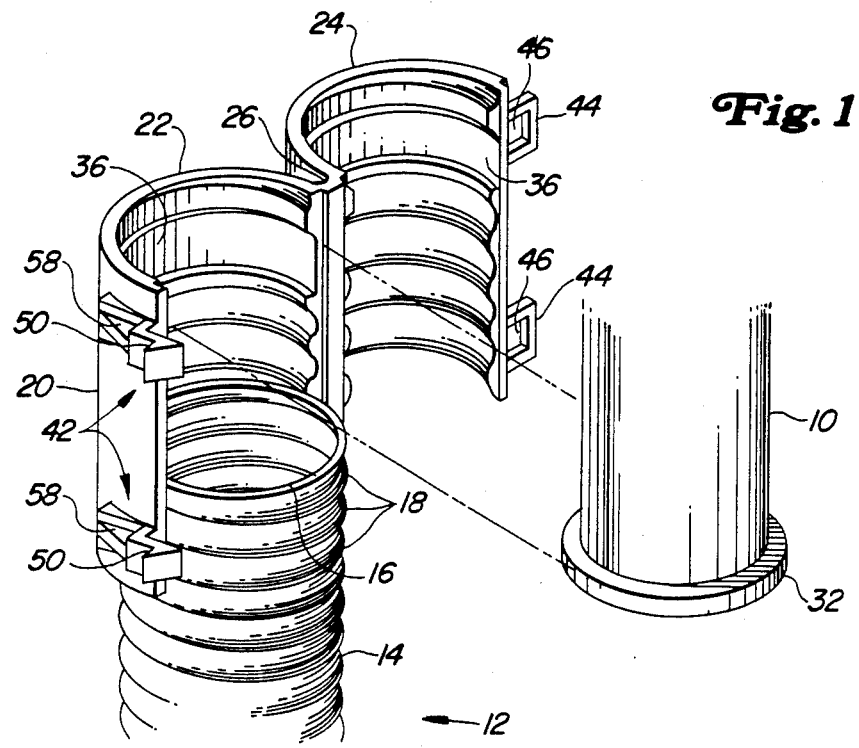
FIG. 1 is a perspective view of an outlet of a distributor or seed meter on an implement and showing the end of a corrugated flexible hose positioned in the hose coupler of the present invention prior to attachment of the hose to the outlet.

Referring now to FIG. 1, there is shown an outlet 10 of a distributing or metering device which is mounted on an implement such as a seeder or drill and receives granular material in the form of seed or fertilizer or the like from a hopper on the implement. When the implement is an air seeder or drill, the distributing device divides a portion of the granular material entrained in an airstream and delivers the material through a hose system 12 to an earthworking tool (not shown) on the implement.

The hose system 12 includes a corrugated, flexible plastic hose 14 having an input end 16 with corrugations 18. A plastic hose coupling 20 is utilized to connect the input end 16 of the hose 14 to the outlet 10.

The hose coupling 20 in its closed position (broken lines of FIG. 3) is generally cylindrical in configuration. The hose coupling includes two semi-cylindrical portions 22 and 24 connected by hinge structure 26 for rocking generally about an axis parallel to the axis of the cylindrical member 20.

The hose 14 is of conventional corrugated construction having a helical outer configuration with a preselected helical pitch. The inside surface of the hose coupling 20 has a mating helical configuration of like pitch along its length with the diameter of the inner portion (in the closed position) approximately equal to the outer diameter of the hose 14.

Figure 2:
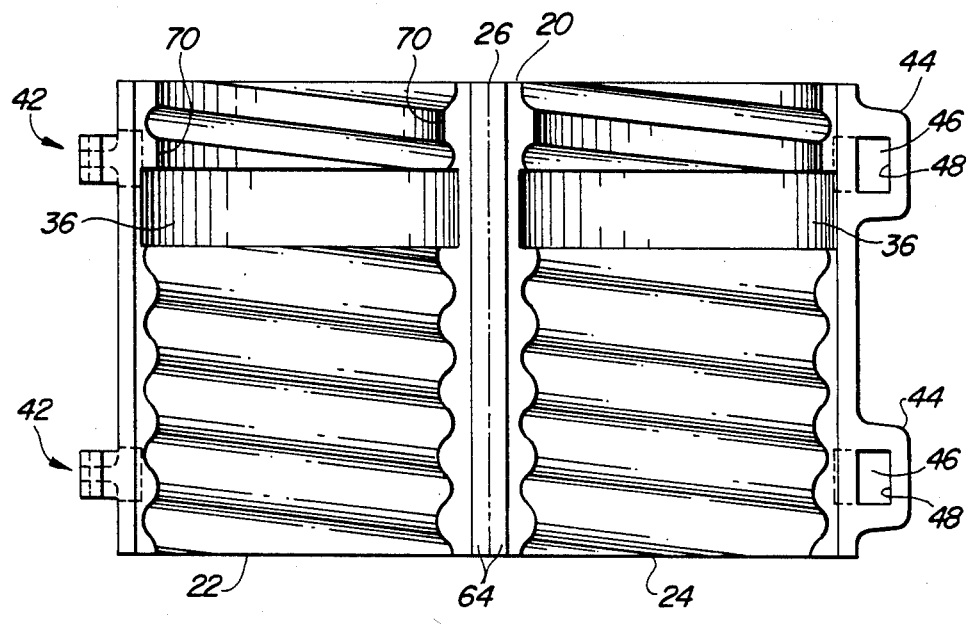
FIG. 2 is an enlarged top view of the hose coupler of FIG. 1 in the open position.

The outlet 10 includes a circular flanged output portion 32, the diameter of which is approximately equal to or slightly larger than the diameter of the hose 14. The hose coupling 20 includes an annular groove 36 located adjacent one end of the coupling. The annular groove 36 has a diameter approximately equal to the diameter of the flanged portion 32 and is adapted to be secured firmly over the flanged portion 32 when the semi-cylindrical portions 22 and 24 are pivoted about the hinge portion to the closed position. As best seen in FIG. 2, several corrugations 18 are adapted to fit snugly within the semi-cylindrical portions 22 and 24 when the portions are closed to prevent the input end 16 of the hose 14 from sliding out from the closed coupler and to provide a relatively airtight seal between the coupler and hose. The hose 14 is positioned to terminate adjacent the annular groove 36 so that none of the input end 16 of the tube is compressed between the flanged portion 32 and the hose coupling 20.

Figure 3:
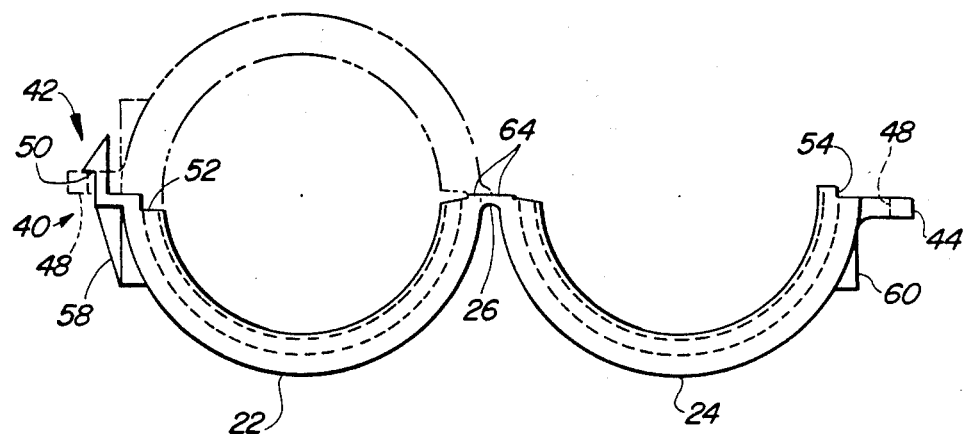
FIG. 3 is an end view of the coupler of FIG. 2 with broken lines showing the coupler in the closed position.

Locking structure 40 is molded integrally with the semi-cylindrical portions 22 and 24 to provide automatic latching of the hose coupling 20 as the portions are closed on each other. The locking structure 40 includes a pair of resilient ramped latches 42 extending generally tangentially (FIG. 3) to the surface of the first semi-cylindrical portion 22 and a mating catch structure 44 extending generally radially from the semi-cylindrical portion 24. Each catch structure 44 defines a rectangular opening 46 with a top connecting portion 48, and as the ramped latch 42 is moved against the corresponding catch structure 44, the top portion 48 cams the latch 42 downwardly until a rear upright surface 50 of the latch springs back against the face of the catch structure 44 (FIG. 3). The semi-cylindrical portions 22 and 24 are stepped at 52 and 54, respectively, to provide an axially extending interlocking arrangement with good dimensional stability and reliable locking action over the hose 14 and flanged portion 32. Latch and catch reinforcing members 58 and 60 extend from the latch 42 and catch 44, respectively, to reinforce the locking structure 40.

The hinge 26 is preferably molded integrally with the portions 22 and 24. Preferably the hose coupling 20 is molded from a polypropylene and the hinge 26 is approximately .5 mm thick. Flattened projections 64 located on each of the portions 22 and 24 adjacent the hinge 26 provide face contact upon hinging of the portions 22 and 24 to the closed position to assure a good fit of the inner diameter of the coupling 20 against the hose 14 and flanged portion 32 secured therein. Therefore, upon closing of the semi-cylindrical portions 22 and 24 against one another, the mating stepped portions 52 and 54 and the mating flattened projections 64 assure relatively close and repeatable dimensional tolerances. If it is necessary to remove a hose 14 from the outlet 10, the ramped latches 42 are simply depressed so that the hose coupling 20 can be rocked to the opened position (FIG. 1) to permit removal of the coupling from the outlet 10 and the hose 14 from the coupling 20.

Figure 4:
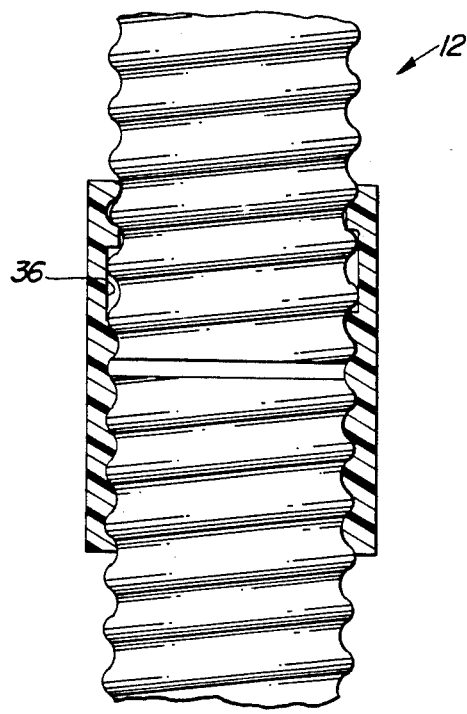
FIG. 4 is a view partially in section showing the coupler connecting two sections of hose.

The inner surface of the hose coupling 20 conforms generally to the outer surface of the hose 14 substantially along the length of the coupling 20 so that two hoses 14 may be connected together (FIG. 4) using the coupling 20. For example, if a hose should break, the broken portions can be placed end-to-end and the coupling 20 snapped in place over the hoses as shown in FIG. 4. Therefore, such a repair can be made quickly and easily without requiring additional components and without affecting the inner diameter of the hose 14.

If necessary to conform to the shape of the outlet 10 upstream of the flanged portion 32, the inner corrugations 18 adjacent the end of the coupling 20 adjacent the annular groove 36 can be flattened as shown at 70 in FIG. 2. A sufficient cross section of the corrugated portion remains to provide good contact when the coupling 20 is utilized as described above for connecting two flexible hoses together.

In operation, the operator simply lays the input end 16 of the hose 14 in one portion of the coupling 20 and positions the corresponding portion of the groove 36 over the flange 32 at the outlet 10. He then swings the other portion of the coupling 20 about the hinge 26 until the latches 42 snap in place against the corresponding catch structure 44. The coupling 20 provides a relatively airtight seal between the outlet 10 and the hose 14 without need for crimping the hose and without need for additional fastening bands or springs. To remove the hoses, the operator simply depresses the latches 42 and swings the portions of the hose coupling 20 to the open position. The device is preferably molded in the open configuration shown in FIG. 2 to facilitate manufacture of the device at a relatively low cost.

Having described the preferred embodiment, it will be apparent that modifications can be made without departing from the scope of the invention as defined in the accompanying claims.

We claim:

1. A hose coupling for selectively connecting one end of a corrugated flexible hose to the output flange of a material distributing device on an implement or to another flexible hose, said hose coupling comprising: a cylindrical member having a central axis and including first and second generally semi-cylindrical portions, means hingedly connecting the semi-cylindrical portions together for rocking with respect to each other about an axis generally parallel to the central axis between open and closed positions, said portions including inner surfaces conforming to the shape of the corrugated hoses to axially secure the hoses within the cylindrical member when said another corrugated hose is selected and the portions are rocked to the closed position, said portions also including a groove extending circumferentially around the inner surface for receiving the flange therein, when said output flange is selected, for securing the cylindrical member to the device output as the cylindrical portions are rocked to the closed position;

means releasably securing the hinged portions in the closed position; and wherein the inner surfaces conforming to the shape of the corrugated hose extend substantially the length of the cylindrical member but are interrupted by the groove.

2. The invention as set forth in claim 1 wherein the means securing comprises a resilient latch member connected to one of the semi-cylindrical portions and a mating catch member connected to the other of the semi-cylindrical portions.

3. The invention as set forth in claim 1 wherein the hose coupling comprises a unitary member molded from a plastic material, and wherein the means hingedly connecting comprises a relatively thin section of the plastic material.

4. The invention as set forth in claim 1 wherein the semi-cylindrical portions include complementary stepped portions adapted for mating engagement upon rocking of the semi-cylindrical portions to the closed position.

5. The invention as set forth in claim 2 wherein the latch member extends tangentially from the one of the semi-cylindrical portions and the catch member defines a generally rectangular opening extending radially from the other portion for receiving the latch member.

6. A hose coupling for a seeding or fertilizing implement for connecting two corrugated flexible hose end portions together in relatively airtight fashion and alternately for connecting one hose end portion to a flanged portion of the implement, said hose coupling comprising: a cylindrical member having a central axis and including first and second generally semi-cylindrical portions, means hingedly connecting the semi-cylindrical portions together for rocking with respect to each other about an axis generally parallel to the central axis between open and closed positions, said portions including inner surfaces conforming to the shape of the corrugated hose end portions to axially secure the hose end portions within the cylindrical member when the portions are in the closed position, wherein the inner surfaces include a grooved section conforming to the shape of the flanged portion of the implement for alternately securing the one hose end portion to the flanged portion;

means releasably securing the hinged portions in the closed position; and wherein said semi-cylindrical portions, means hingedly connecting and means releasably securing are molded as a unitary structure from a plastic material and wherein the inner surfaces conforming to the shape of the corrugated hose extend substantially the length of the cylindrical member except at the grooved section.

* * * * *